United States Patent [19]

Dräbing et al.

[11] Patent Number: 5,205,590
[45] Date of Patent: Apr. 27, 1993

[54] MUDFLAP FOR VEHICLES

[75] Inventors: Walter Dräbing, Niestetal; Manfred Müller, Kassel; Thomas Barth, Witzenhausen, all of Fed. Rep. of Germany

[73] Assignee: WEGU Gummi- und Kunststoffwerke Walter Drabing KG, Kassel, Fed. Rep. of Germany

[21] Appl. No.: 880,029

[22] Filed: May 8, 1992

[30] Foreign Application Priority Data

May 11, 1991 [DE] Fed. Rep. of Germany .... 4115516.5

[51] Int. Cl.$^5$ .............................................. B62D 25/16
[52] U.S. Cl. ................................... 280/851; D12/185
[58] Field of Search ........................ 280/847, 848, 851; D12/185

[56] References Cited

U.S. PATENT DOCUMENTS 4,382,606 5/1983 Lightle et al. ....................... 280/851
5,022,680 6/1991 Eklund, Jr. ....................... 280/851

FOREIGN PATENT DOCUMENTS 2207647 2/1989 United Kingdom ................ 280/851

Primary Examiner—Richard M. Camby
Attorney, Agent, or Firm—Hopkins & Thomas

[57] ABSTRACT

A mudflap for vehicles, whereby said the mudflap has a flat main body (1) with ribs (11), arranged in a V-formation for the intercepting, slowing-down and diverting of water thrown up from the wheel of a vehicle, and channels (24, 26, 29), for guiding water intercepted and diverted in the central area (9) down and away, located in two side areas (10) arranged symmetrically about the central longitudinal plane (8). The ribs are provided in a V-formation inclined downwardly from their apex in the region of the central longitudinal plane (8), and have a cross-section which tapers from the main body (1) to the free end. They are arranged so close to each other that the grooves (14) between the ribs (11) have approximately the same cross-sectional area, admittedly the other way round, as the cross-sectional area of the ribs (11). The channels (24, 26, 29) located in the side areas (10) are open on the sides facing the wheel of the vehicle and have at least two continuous longitudinal ribs (20, 21, 22), whereby the longitudinal rib (20) facing the central longitudinal plane (8) is lower in height than the longitudinal rib (22) facing the longitudinal edge (4 or 5) of the mudflap.

9 Claims, 3 Drawing Sheets

MUDFLAP FOR VEHICLES

BACKGROUND OF THE INVENTION

The invention refers to a mudflap for vehicles, whereby said mudflap has a flat main body, made from rubber, plastic or similar material, on the rear side of which, facing the wheel of the vehicle, ribs are provided in a V-formation in a central area for the intercepting, slowing-down and diverting of water thrown up from the wheel of a vehicle, and channels, for guiding water intercepted and diverted in the central area down and away, located in two side areas arranged symmetrically about the central longitudinal plane. Such a mudflap is understood to be a preformed part matched to the wheel housing of the wheel concerned or a plate-shaped material which is cut to the respective dimensions and, thereby, matched to the geometrical conditions of the point of attachment. This is particularly applicable to mudflaps for trucks. The mudflap can be made from rubber, plastic or another elastomeric material. With such mudflaps, the interception of dirt, i.e. preventing stones from striking parts of the vehicle bodywork, is of less importance. Much more important is the interception of water which is thrown up from the associated wheels of the vehicle from carriageways made wet by rain. In particular, water can also accumulate or collect up to a certain water level in the furrows worn into the road surface by the continuous passage of heavy vehicles so that the quantity of water thrown off from the vehicle wheel can fluctuate between relatively wide limits. When water strikes the mudflap or other parts of the bodywork, especially in the area of the wheel housing or mudguard, a swirling occurs together with the formation of a fine spray (mist) which is particularly noticeable with trucks. The occurrence of such a fine spray hampers not only the view to the rear along the side of the vehicle as seen in the rear-view mirror, but also represents a visibility problem for traffic travelling past or overtaking.

A mudflap of the above-mentioned type is known from EP-OS 302 718. The mudflap is constructed as a molded body and has an area with ribs on the side facing the wheel of the vehicle, whereby said ribs are arranged obliquely to the surface of the main body, and whereby an angle of 75° is preferred. The ribs are inclined upwardly, at least in the central area, in a V-formation with respect to the horizontal plane. The ribs can continue in horizontal or downwardly inclined areas. However, in the central area, in which, according to experience, the greatest amount of water accrues, the ribs are arranged inclined upwards in V-formation. The ribs themselves possess walls which are parallel, i.e. have the same thickness throughout their height, and the free ends have rather sharp edges. In the side areas there are channels for guiding the water intercepted in the central area down and away, whereby these channels are formed by walls which are C-shaped in cross-section so that the channels are constructed such that they are closed to the rear and can only be filled laterally from the central area. Thereby, an undisturbed guiding of the intercepted water down and away is possible provided the water reaches these channels and is prevented from swirling through striking the central area.

A mudflap for vehicles is known from DE-OS 20 45 212 which has a multitude of ribs which are fastened together by wires or pins and which have individual surfaces so arranged and constructed that water thrown up from the wheel of the vehicle strikes the surfaces at an acute angle. In doing this, the water should lose some of its speed and energy. The individual surfaces of the ribs are parallel and spaced out at intervals, partly arranged in pairs or also constructed as longitudinal and transverse webs. In all these versions, a surface is used which is arranged obliquely to the impact direction of the spray water in order to absorb energy. No account is taken of how the water which has been slowed down should be further conveyed. As a rule, there are openings between the ribs, for example, in the form of slots, through which the water passes in a direction opposite to that of the direction of travel.

In order to counteract the formation of fine spray described, a mudflap is also known from DE-OS 31 02 805. The mudflap has a flat main body upon which, on the rear side facing the vehicle wheel, protuberances are provided as flexible individual elements in the form of essentially slim, perpendicular stoppers or extensions. These protuberances possess roughly the shape of cylinders or truncated cones tapering in the direction of their free end, and are distributed asymmetrically over the main area of the main body without any relationship to each other. The distances between the individual elements or protuberances are always arranged differently. The protuberances should brake the impact energy of the water droplets and so influence the direction of rebounding water droplets that the formation of a dangerous fine spray is avoided. The elastic structure of the protuberances should counteract the adherence and attaching of dirt to the rear side of the main body so that the shaking motion occurring during operation should present an advantageous self-cleaning effect. The fine spray which occurs can only be prevented here to a certain degree. The flat section of the main area or the rear side of the mudflap, which intercepts the water thrown up by the vehicle wheel in a more or less vertical direction, is relatively high so that the individual water droplets are subjected to an explosion or rather, atomization action which does not lead to a reduction of the fine spray effect. On the contrary, such water droplets which strike the protuberances are intercepted, slowed down and diverted, whereby the diversion of the water happens in an uncontrolled fashion to all sides. A certain danger of becoming dirty through waste deposits adhering or attaching, especially when the extensions are in cylindrical form, cannot be disputed. During the cold seasons, slush and snow is often thrown up or spun off from the vehicle's tires. In the appropriate climatic conditions this can lead to a build-up of a complete layer of ice on the rear side of the mudflap, i.e. a levelling-off of the surface of the mudflap, so that any advantageous effect is eliminated. The main body of such a mudflap must be constructed relatively stable because it must also maintain the shape of the mudflap against the pressure of the wind caused by the motion of the vehicle and the water spray thrown up. If, on the other hand, the protuberances have to be made very flexible so that a considerable shaking effect can be established through the vibrations which occur, then two different material compounds made from rubber or another elastomer must often be incorporated and pressed together, thereby making the manufacture of such mudflaps time-consuming and expensive. If the number of protuberances on the rear side of the mudflap is increased, then the braking effect is also increased. On the other hand, manufacture becomes more awkward because the grooves in the tools can be clogged during molding, in fact the finer and slimmer the individual truncated cone objects are formed and arranged, the greater this pressing effect.

SUMMARY OF THE INVENTION

It is the object of the invention to further develop a mudflap of the above-mentioned type such that a very large proportion of the water sprayed onto it, in particular more than 70%, is reliably discharged downwardly so that, in this way, the formation of a fine spray is counteracted.

According to the invention, this is achieved with a mudflap of the aforementioned type in that the ribs are provided inclined downwardly in V-formation from their apex on the central longitudinal plane, possess a cross-section which tapers from the main body to their free end, and are located so close to each other that the grooves between the ribs have approximately the same cross-sectional area, admittedly the other way round, as the cross-sectional area of the ribs, and that the channels located in the side areas are open on the sides facing the wheel of the vehicle and have at least two continuous longitudinal ribs whereby the longitudinal rib facing (nearest) the central longitudinal plane is lower in height than the longitudinal rib facing the longitudinal edge of the mudflap.

The invention is based on the conception that water thrown up from the wheel of the vehicle, which strikes the central area of the mudflap, firstly has to be intercepted and slowed down. The ribs serve to do this and are so relatively close to each other that limiting surfaces of the ribs, which come into contact with and brake the water thrown up, are available practically overall. The surface of the main body positioned essentially perpendicular to the spray direction of the water is, therefore, not utilized to intercept the water. The grooves formed between the ribs serve, in conjunction with the rib arrangement inclined downwardly in V-formation, to discharge the intercepted water to the right and left of the central longitudinal plane of the mudflap, whereby the water is guided in relatively narrow channels. The force of gravity and the air stream in the region of the wheel housing in front of the mudflap are exploited using this mechanism in order to bring about the lateral diversion of the water into the grooves. With greater quantities of waste spray water, it is first and foremost a problem of discharge, i.e. of freeing the central area again and again so that it may be used to intercept further spray water. The arrangement of the ribs in a V-formation inclined upwardly, as known from the state-of-the-art, does not lead to a solution because the force of gravity acts in the opposite direction. In the version according to this application, there results a balance between the force effected by the force of gravity and the forces generated by the air streams so that the spray water, distributed in the grooves between the ribs, is moved from the central area towards the outside and does not flow over the ribs. Therefore, a large proportion of the surface of the ribs is constantly freed or kept free so that further spray water can be accepted and braked thereby.

The channels located in the side areas are open on the sides facing the wheel of the vehicle so that water spun off laterally from the vehicle wheel can strike a film of water moving downwardly and be taken along with this. The longitudinal ribs are arranged with an appropriate spacing between them so that a laminar, not too thick film of water results here, flowing downwardly. The longitudinal ribs facing the central longitudinal plane act in this case, so to speak, as a trip step. Each longitudinal rib is of a lower height compared to the other longitudinal rib so that some of the water guided down the grooves of the V-formation ribs can flow over this first longitudinal rib, while the rest does not manage to flow over and runs away downwardly before the first longitudinal rib. Therefore, the first longitudinal rib acts as a dividing element for the water. It should be understood that more than two longitudinal ribs may be provided, whereby it is advisable to allow the height of the longitudinal ribs to rise in stages from the inside to the outside in order to prevent water from flowing beyond the longitudinal edges of the mudflap but rather, to guide the water downwardly over the transverse edge.

The ribs arranged in V-formation should be provided at an angle with the horizontal which lies within the range 18° to 22°, preferably 20°. Trials have shown that this range of angles is advantageous insofar as the intercepted water droplets are conveyed away in the grooves parallel to the straight extension of the ribs, or rather the grooves, as a result of the influence of the force of gravity and the air stream in the wheel housing. In this case, neither build-up of the water nor an overflow of water droplets over the individual ribs transverse to the direction of same is to be observed.

The ribs arranged in V-formation should have a height of 15 to 20 mm, preferably approx. 17 mm, and be spaced out at 8 to 12 mm from each other, preferably approx. 10 mm. Thereby, the ribs are located comparatively very close to each other resulting in an oblique braking surface on the ribs for practically every water droplet so that energy may be absorbed. However, it is also possible, while still maintaining the relationships which have been formed, to enlarge or diminish the ribs and grooves overall.

The flanks of the ribs can exhibit an angle of approx. 16° to 18° and the free end of the ribs may be rounded off. It is not the aim to intercept the water droplets on the free ends of the ribs but, on the contrary, on their flanks, whereby these flanks are arranged at a very flat angle oblique to the impact direction of the water droplets spun off from the wheel of the vehicle.

The ribs arranged in V-formation are themselves provided projecting at right-angles to the main body, i.e. a center line of the ribs extends perpendicular to the main body.

The longitudinal rib facing the central longitudinal plane can have a height of approx. 7 mm and the other longitudinal ribs 15 to 20 mm, preferably approx. 17 mm. Thereby, the first longitudinal rib in the direction of the water flowing from the free ends of the grooves has, first and foremost, a dividing function. One part of the water flows over and beyond this first longitudinal rib, while a second part of the water is slowed down. Thereby, channels are formed, separate from each other to the left and right of the first longitudinal rib, in which the respectively divided water is guided downwardly. Several longitudinal ribs may also be provided, the height of which, advisably, increases in stages from the inside to the outside. The outermost longitudinal rib which is arranged at the longitudinal edge of the mudflap should be of such a height that as little water as possible can flow over it because this overflow of water is connected with lateral detachment phenomena from the mudflap, whereby the formation of fine spray is again increased.

The longitudinal rib facing the central longitudinal plane can be located at a distance from the free end of the ribs arranged in V-formation, and spaces can also be provided between the other longitudinal ribs. These spacings are relatively wide so that flat areas are provided here for always conveying the water downwardly in a thin, veil-type curtain.

It is also advisable to provide the longitudinal ribs projecting at right-angles to the main body. This serves not only the ease of removing the mudflap body from the press mold or injection mold but also offers the guarantee that the longitudinal ribs fulfill their braking and diverting function for the intercepted water in an optimum manner.

The central area, in which the V-formation ribs are located, can cover roughly half the area of the main body. Generally, the central area is arranged slightly larger than the rest of the surface of the main body. However, the channels open to the rear in the side areas are constructed unusually wide—in relation to the extent of the central area.

The longitudinal ribs are provided with open ends at the lower edge of the main body so that the water flowing downwardly in divided streams may leave the lower transverse edge of the mudflap without obstruction. This is a region in which the air stream exhibits comparatively low speeds so that the danger of the formation of fine spray upon detachment is reduced to a very great extent.

BRIEF DESCRIPTION OF THE DRAWINGS

The invention will be further explained and described by means of a preferred embodiment example of the mudflap.

DETAILED DESCRIPTION

Figure 1:
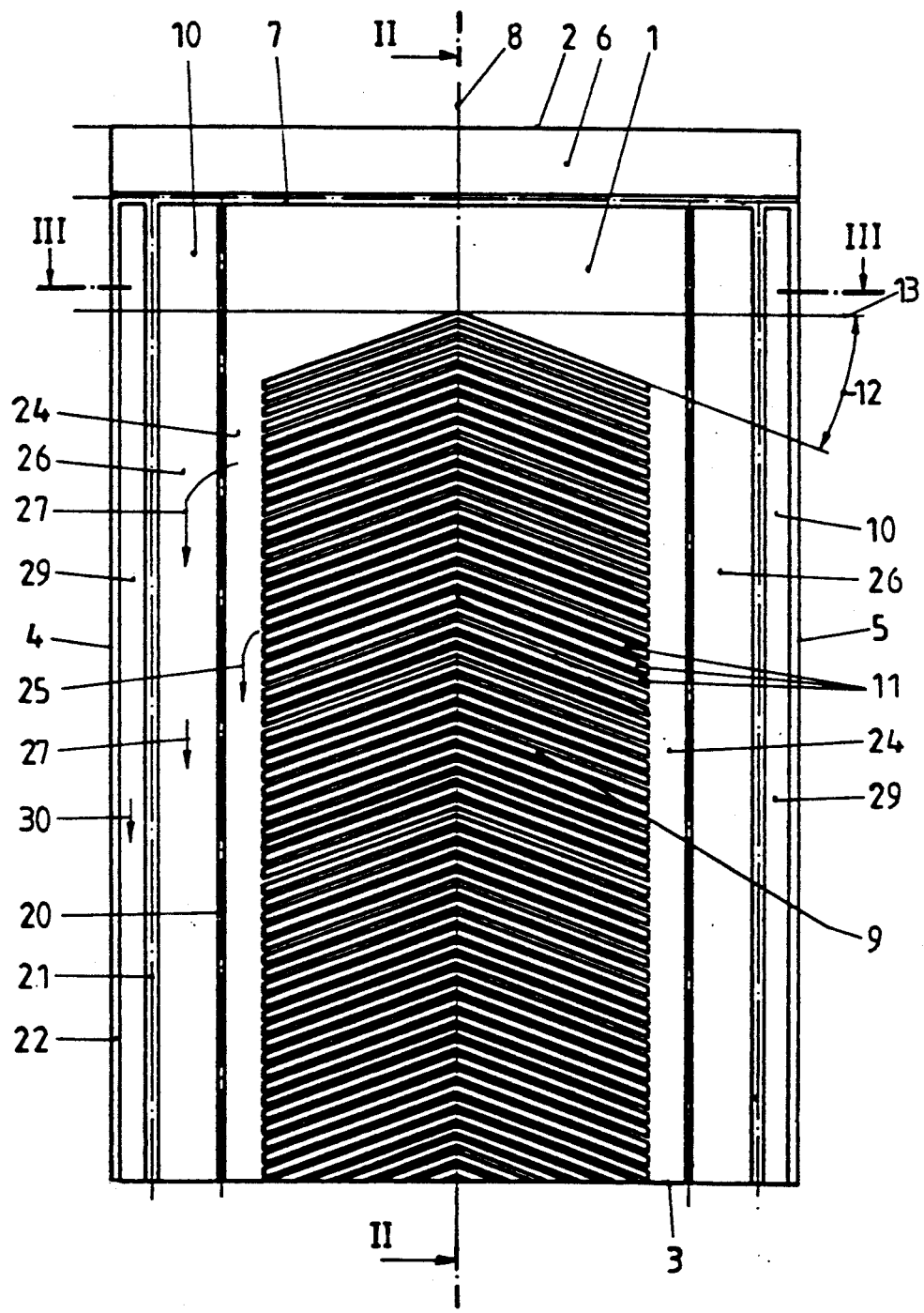
FIG. 1 shows a view of the rear side of the mudflap in a flat condition.
Figure 2:
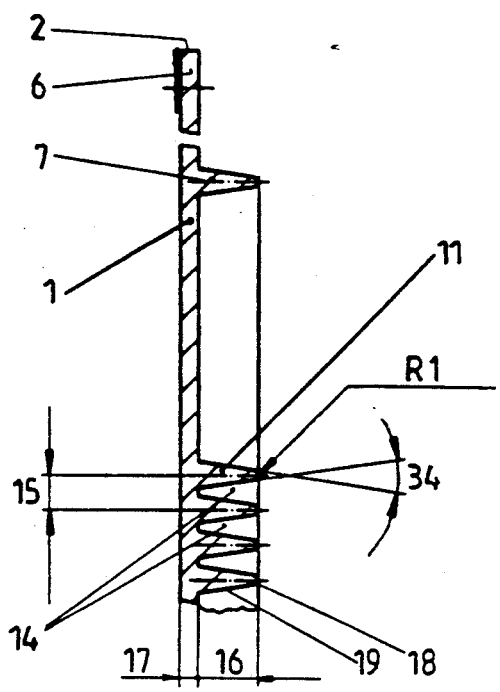
FIG. 2 shows a cross-section according to line II—II in FIG. 1.
Figure 6:
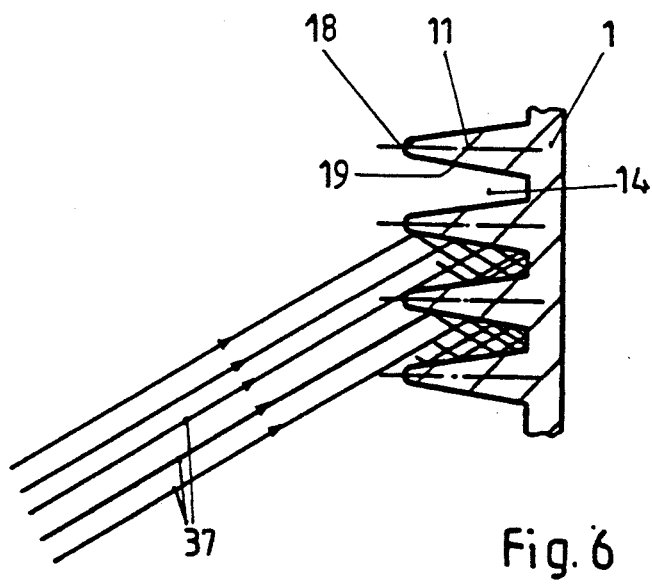
FIG. 6 shows a detail according to mark VI in FIG. 5.

The mudflap has a flat main body 1 as can also be particularly well seen from FIG. 2. The mudflap is here already manufactured as a moulding part and possesses an upper transverse edge 2, a lower transverse edge 3 and two longitudinal edges 4 and 5. A fixing strip 6, which serves for the attachment to the vehicle, runs along the upper transverse edge 2. The fixing strip 6 is limited by a transverse rib 7. Below the transverse rib 7, the main body 1 forms a main flap which, like the fixing strip 6, is constructed symmetric about a central longitudinal plane 8. Left and right of the central longitudinal plane 8, in the direction of the longitudinal edges 4 and 5, there extend firstly a central area 9 and two side areas 10. Ribs 11 in V-formation are provided in the central area 9 which run straight and are arranged relatively close to each other as can also be seen from FIGS. 2 and 6. The ribs 11 extend in a straight line away from their apex located on the central longitudinal plane 8, whereby they are arranged in a V-formation inclined downwards. The angle 12 between a horizontal 13 and the leg of the ribs 11 lies in the range from 18° to 22°, preferably approx. 22°. Grooves 14 extend between the ribs 11 which, as a result of the arrangement of the ribs, also run in a straight line and openly merge into the area of the main body 1. The respective side area 10, extending to the longitudinal edges 4 or 5, begins at this transition point. The area of the central region 9, in which the ribs 11 are arranged in V-formation inclined downwards, is slightly larger than the area of the two side areas 10.

The construction of the ribs 11 and the intermediate grooves 14 can be seen in detail in FIG. 2. The ribs 11 and the grooves 14 have approximately equal cross-sectional areas, albeit in reverse. The ribs 11 are located at spacing 15 which can be approx. 10 mm. The height 16 of the ribs 11 is 17 mm and the thickness 17 of the main body 1 some 5 mm. The ribs 11 taper in a conical fashion towards their free end so that a reversed cross-sectional arrangement results for the grooves 14. The free ends 18 of the ribs 11 are rounded off. The flanks 19 of the ribs 11 run obliquely, i.e. not at right-angles, to the main plane of the main body 1.

Figure 3:
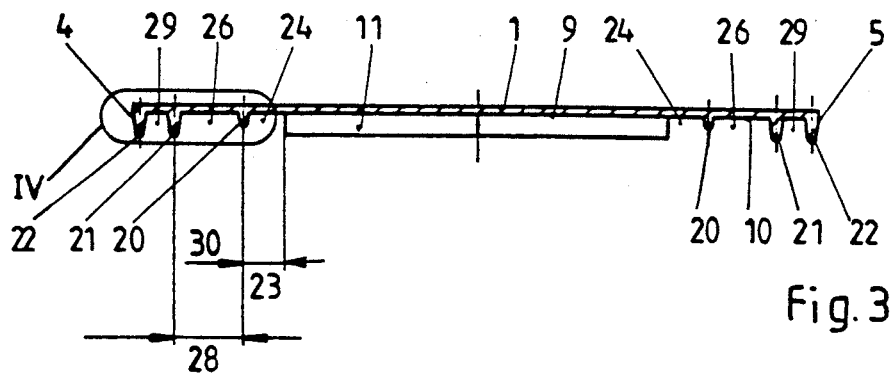
FIG. 3 shows a cross-section according to line III—III in FIG. 1.
Figure 4:
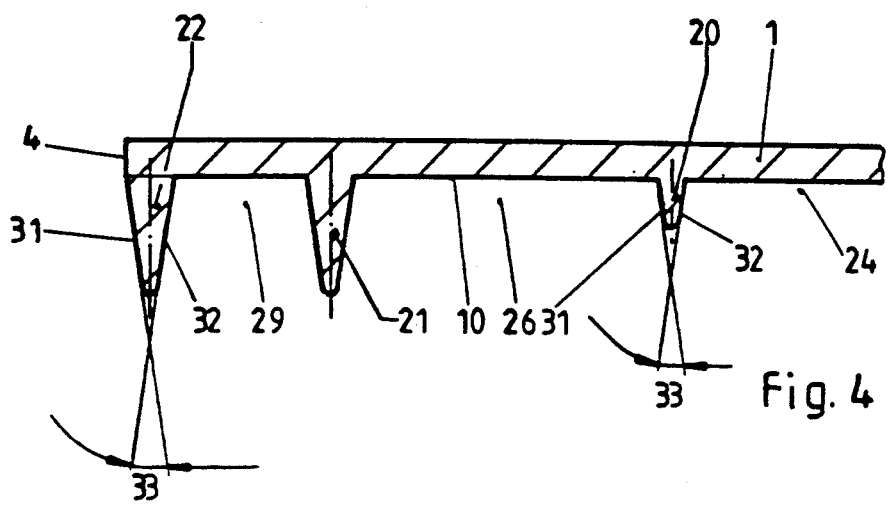
FIG. 4 shows a detail according to mark IV in FIG. 3.

FIGS. 3 and 4 illustrate the construction of the side areas 10. A first longitudinal rib 20, a second longitudinal rib 21 and a third longitudinal rib 22 are provided here and said ribs extend from top to bottom continuously over each side area 10 parallel to the longitudinal edges 4 and 5. The first longitudinal rib 20 faces the central longitudinal plane 8 of the mudflap or rather, represents the first longitudinal rib seen in the direction of the water flowing from the inside to the outside. A separation 23, 30 mm in the embodiment example shown, is provided between the lateral free end of the ribs 11 and the longitudinal rib 20. A first channel 24 is formed here in order to convey downwardly, parallel to edges 4 and 5, some of the water intercepted and slowed down in the central area 9. This discharge direction for some of the water is indicated by arrow 25. An amount of water flows over the longitudinal rib 20 and into the area of a channel 26 formed between ribs 20 and 21 and then moves downwardly according to arrow 27. Ribs 20 and 21 are separated by a distance 28 which is, for example, 50 mm in this case. Finally, there is another channel 29 between the two longitudinal ribs 21 and 22 which is also arranged continuous from top to bottom in order to accept the residual amount of water, in cases of extremely large quantities of water, which flows sideways over longitudinal rib 21. This residual water is then guided downwardly according to arrow 30. In no case does any significant amount of water escape over the longitudinal rib 22 on the lateral edge. Channels 24, 26 and 29 are constructed open towards the front, i.e. pointing in the direction of travel seen from the rear side of the mudflap. However, the first longitudinal rib 20 is lower in height than the subsequent longitudinal rib 21 seen in the direction of flow. At least two longitudinal ribs 20 and 21 should be provided. However, the number of longitudinal ribs can also be increased as is illustrated, whereby with three longitudinal ribs 20, 21, 22, the arrangement shown in the drawing should be provided. The longitudinal ribs 20, 21, 22 also taper in conical fashion towards their free end. Their two flanks 31, 32 can form an angle 33 with each other of 17°±1°. The flanks 19 of ribs 11 (FIG. 2) can be arranged in a similar manner. Once again, the angle 34 here is 17°±1°.

Figure 5:
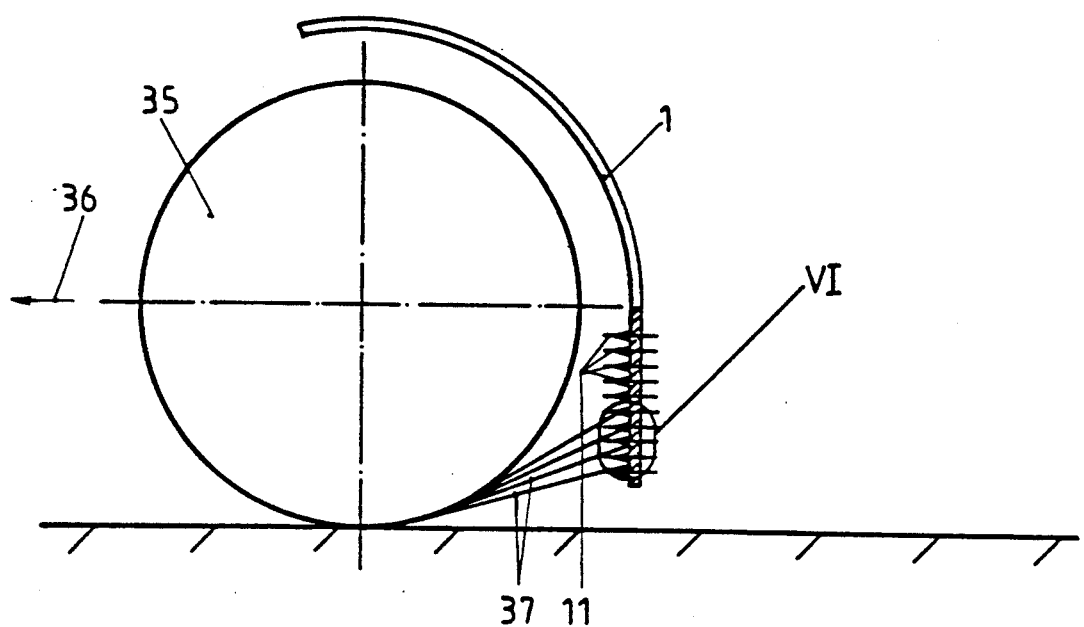
FIG. 5 shows a schematic side view of the mudflap in the mounted condition.

FIG. 5 illustrates the arrangement of the mudflap relative to the wheel of the vehicle 35. The vehicle's direction of travel is given by arrow 36. The main body 1 of the mudflap is so arranged that its ribs 11 face the wheel of the vehicle 35. The water thrown up by the wheel of the vehicle 35 splashes up according to the jets of water 37 diagonally onto the flanks 19 of ribs 11 and is slowed down or broken up there so that the water loses considerable kinetic energy. The intercepted and braked water is acted upon by the force of gravity on the one hand, and on the other, by forces created by the movements of the air in the wheel housing. The downwardly inclined V-formation, or rather, open arrangement of the ribs 11 relative to each other, and at an angle 12 to the horizontal 13, now has the effect that, with a multitude of motion conditions, the water flows distributed between the individual grooves 14 extending from the central longitudinal plane 8 to the right and left towards the side areas 10 without being able to flow over the ribs 11. These divided streams then come to the free ends of the ribs 11 and move into channel 24 where they again become one united stream. However, as their direction of motion is parallel to the line of the ribs 11, the first longitudinal rib 20 functions as a braking and dividing rib, i.e. some of the water moves on further according to arrow 25 and some according to arrow 27. The quantity of water is, therefore, divided up. It is important that water is, in every case, so intercepted and slowed down in the area of the ribs 11, or rather grooves 14, that it does not hinder the braking process of the water that follows. Furthermore, it must be ensured that the water in the grooves 14 is led away sufficiently quickly outwardly to the right and left in the direction of side areas 10. This is guaranteed by angle 12.

With the new mudflap arrangement it is possible, according to the test specifications applicable, to intercept, slow down and lead away downwardly up to almost 80% of water splashed up. In one trial, 77% was measured. The mudflap absorbs, therefore, according to European Community Official Gazette No. C 263/19, 77% of the water thrown up.

LEGEND FOR FIGURES:

1 = Main body
35 = Wheel of vehicle
2 = Upper transverse edge
36 = Arrow
3 = Lower transverse edge
37 = Jets of water
4 = Longitudinal edge
5 = Longitudinal edge
6 = Fixing strips
7 = Transverse rib
8 = Central longitudinal plane
9 = Central area
10 = Side area
11 = Rib
12 = Angle
13 = Horizontal
14 = Groove
15 = Spacing
16 = Height
17 = Thickness
18 = End
19 = Flank
20 = Longitudinal rib
21 = Longitudinal rib
22 = Longitudinal rib
23 = Spacing
24 = Channel
25 = Arrow
26 = Channel
27 = Arrow
28 = Spacing
29 = Channel
30 = Arrow
31 = Flank
32 = Flank
33 = Angle
34 = Angle While the invention has been disclosed in detail in the foregoing specification and drawings, it will be understood by those skilled in the art that variations and modifications of the disclosed embodiment can be made without departure from the spirit and scope of the invention as set forth in the following claims.

We claim:

1. A mudflap for vehicles, said mudflap comprising a generally flat main body made from rubber, plastic or similar material, and a rear surface for facing the wheel of a vehicle, ribs arranged on said rear surface being provided in a V-formation in a central area of said rear surface of said main body for intercepting, slowing-down and diverting water thrown up from the wheel of a vehicle, and channels arranged on said rear surface for guiding water intercepted and diverted in the central area downwardly, said channel being located in two side areas arranged symmetrically about a central longitudinal plane of the mudflap, the improvement therein comprising said ribs (11) being provided in an inverted V-formation inclined downwardly from their apex at the central longitudinal plane (8), the ribs each having a cross-section which tapers from the main body (1) to a free end (18) and the ribs being arranged in close proximity to each other so that grooves (14) between the ribs (11) have approximately the same cross-sectional area as the cross-sectional area of the ribs (11), and the channels (24, 26, 29) located in the side areas (10) being open on the sides facing the wheel of the vehicle and each having at least two continuous longitudinal ribs (20, 21, 22) one spaced closer to the central longitudinal plane than the others, with the one longitudinal rib (20) nearest the central longitudinal plane (8) being lower in height than the other longitudinal rib (22) spaced farther from the central longitudinal plane of the mudflap, wherein the ribs (11) are provided in a V-formation at an angle (12) in a range 18° to 22° to the horizontal (13).

2. Mudflap according to claim 1, wherein the ribs (11) arranged in V-formation have a height of from 15 to 20 mm and a spacing (15) between each other of 8 to 12 mm.

3. Mudflap according to claim 1, wherein the ribs are tapered toward their free ends with the flanks (19) of the ribs (11) have an angle with respect to each other of approximately 16° to 18°, and that the free end (18) of the ribs (11) are rounded off.

4. Mudflap according to claim 1, wherein the ribs (11) arranged in V-formation project perpendicular to the main body (1).

5. Mudflap according to claim 1, wherein the longitudinal rib (20) nearest the central longitudinal plane (8) has a height of approx. 7 mm and the other longitudinal ribs (21, 22) have a height of approximately 15 to 20 mm.

6. Mudflap according to claim 1, wherein the longitudinal rib (20) nearest the central longitudinal plane (8) is located at a distance from the ribs (11) arranged in V-formation, and wherein gaps (28) are provided between the other longitudinal ribs.

7. Mudflap according to claim 1, wherein the longitudinal ribs (20, 21, 22) are provided projecting perpendicular to the main body (1).

8. Mudflap according to claim 1, wherein the central area (9), in which the ribs (11) are arranged in V-formation is approximately one-half the width of the main body (1).

9. Mudflap according to claim 5, wherein the longitudinal ribs (20, 21, 22) are provided with free ends at a lower transverse edge (3) of the main body (1).

* * * * *